(12) United States Patent
Han et al.

(10) Patent No.: US 10,971,091 B2
(45) Date of Patent: Apr. 6, 2021

(54) ARRAY SUBSTRATE, DISPLAY PANEL AND DRIVING METHOD THEREOF, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenchao Han, Beijing (CN); Wei Sun, Beijing (CN); Wei Wang, Beijing (CN); Yifan Song, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/400,432

(22) Filed: May 1, 2019

(65) Prior Publication Data
US 2020/0013355 A1 Jan. 9, 2020

(30) Foreign Application Priority Data
Jul. 3, 2018 (CN) .......................... 201810713841.5

(51) Int. Cl.
*G09G 3/36* (2006.01)
*G02F 1/1335* (2006.01)

(52) U.S. Cl.
CPC ..... *G09G 3/3614* (2013.01); *G02F 1/133514* (2013.01); *G09G 3/3685* (2013.01); *G02F 2201/52* (2013.01); *G09G 2300/0823* (2013.01)

(58) Field of Classification Search
CPC ...... G09G 3/3614; G09G 3/3685; G09G 3/00; G09G 2300/0823; G02F 1/133514; G02F 2201/52
See application file for complete search history.

(56) References Cited

U.S. PATENT DOCUMENTS 9,311,873 B2   4/2016 He
10,049,638 B2  8/2018 Lin
(Continued)

FOREIGN PATENT DOCUMENTS

CN   103310756 A   9/2013
CN   104391409 A   3/2015
(Continued)

OTHER PUBLICATIONS

First Chinese Office Action from corresponding Chinese Patent Application No. 201810713841.5 dated Sep. 1, 2020.

*Primary Examiner* — Towfiq Elahi
(74) *Attorney, Agent, or Firm* — Dilworth & Barrese, LLP.; Michael J. Musella, Esq.

(57) ABSTRACT

An array substrate, a display panel and a driving method thereof, and a display device are provided. The array substrate includes a plurality of pixel units arranged in an array, each of the plurality of pixel units includes at least four sub-pixel units corresponding to different colors. When the array substrate displays a frame of image, in each row of pixel units, polarities of pixel voltages received by two sub-pixel units corresponding to the same color in adjacent two pixel units are different; a polarity of each pixel voltage represents the magnitude of each pixel voltage relative to a common voltage.

20 Claims, 8 Drawing Sheets

(56) References Cited

U.S. PATENT DOCUMENTS

| | | | | |
|---|---|---|---|---|
| 2005/0206597 A1* | 9/2005 | Ishii | ............ | G09G 3/3688 |
| | | | | 345/87 |
| 2006/0202927 A1* | 9/2006 | Lee | ............ | G02F 1/1368 |
| | | | | 345/88 |
| 2010/0328360 A1* | 12/2010 | Miyashita | ............ | G09G 3/3614 |
| | | | | 345/690 |
| 2015/0379947 A1* | 12/2015 | Sang | ............ | G09G 3/3614 |
| | | | | 349/37 |
| 2018/0182324 A1* | 6/2018 | Lin | ............ | G09G 3/36 |

FOREIGN PATENT DOCUMENTS

| | | |
|---|---|---|
| CN | 104575432 A | 4/2015 |
| CN | 105469765 A | 4/2016 |
| CN | 107301853 A | 10/2017 |

\* cited by examiner

ARRAY SUBSTRATE, DISPLAY PANEL AND DRIVING METHOD THEREOF, AND DISPLAY DEVICE

CROSS-REFERENCE TO RELATED APPLICATION

The present application claims priority of Chinese Patent Application No. 201810713841.5, filed on Jul. 3, 2018, the disclosure of which is incorporated herein by reference in its entirety as part of the present application.

TECHNICAL FIELD

The embodiments of the present disclosure relate to an array substrate, a display panel and a driving method thereof, and a display device.

BACKGROUND

Many electronic devices (such as mobile phones, televisions, computers, etc.) use liquid crystal display panels for display. With the development of science and technology and competition in the market, people's requirements for the liquid crystal display panels are gradually increasing.

SUMMARY

At least one embodiment of the present disclosure provides an array substrate, which comprises a plurality of pixel units arranged in an array, each of the plurality of pixel units comprises at least four sub-pixel units corresponding to different colors, respectively; when the array substrate displays a frame of image, in each row of pixel units, polarities of pixel voltages received by two sub-pixel units corresponding to a same color in adjacent two pixel units are different; and a polarity of each pixel voltage represents a magnitude of each pixel voltage relative to a common voltage.

For example, in the array substrate provided by some embodiments of the present disclosure, each of the plurality of pixel units includes four sub-pixel units corresponding to different colors, respectively, and adjacent two rows of pixel units are staggered by a distance of two sub-pixel units.

For example, the array substrate provided by some embodiments of the present disclosure further includes a plurality of data lines, each column of sub-pixel units is connected to one of the plurality of data lines, the plurality of data lines are divided into a plurality of first data line groups and a plurality of second data line groups, and polarities of pixel voltages received by data lines in the plurality of first data line groups are different from polarities of pixel voltages received by data lines in the plurality of second data line groups.

For example, in the array substrate provided by some embodiments of the present disclosure, the pixel voltages received by the data lines in the plurality of first data line groups are larger than the common voltage, and the pixel voltages received by the data lines in the plurality of second data line groups are smaller than the common voltage; or the pixel voltages received by the data lines in the plurality of first data line groups are smaller than the common voltage, and the pixel voltages received by the data lines in the plurality of second data line groups are larger than the common voltage.

For example, the array substrate provided by some embodiments of the present disclosure further comprises a plurality of switch circuits and a plurality of control lines, the plurality of switch circuits are divided into a plurality of first switch circuit groups and a plurality of second switch circuit groups, each data line in the plurality of first data line groups is respectively connected with one switch circuit in the plurality of first switch circuit groups, and each data line in the plurality of second data line groups is respectively connected with one switch circuit in the plurality of second switch circuit groups; each of the plurality of control lines is connected to one switch circuit in the plurality of first switch circuit groups and to one switch circuit in the plurality of second switch circuit groups, different switch circuits in each of the plurality of first switch circuit groups are respectively connected to different control lines, and different switch circuits in each of the plurality of second switch circuit groups are respectively connected to different control lines.

For example, in the array substrate provided by some embodiments of the present disclosure, a number of the plurality of control lines includes 3, 4, 5, or 6.

For example, in the array substrate provided by some embodiments of the present disclosure, each of the plurality of switch circuits includes a transistor, a gate electrode of the transistor is connected to a corresponding control line in the plurality of control lines, a first electrode of the transistor is connected to a corresponding data line in the plurality of data lines, and a second electrode of the transistor is configured to receive a pixel voltage.

At least one embodiment of the present disclosure also provides a display panel, which comprises an array substrate provided by the embodiment of the present disclosure, a data drive circuit and a multi-channel selection circuit, the data drive circuit is connected with the plurality of data lines to provide pixel voltages; the multi-channel selection circuit is connected with the plurality of control lines to provide control signals to control the plurality of data lines and the data drive circuit to be turned on or off.

At least one embodiment of the present disclosure also provides a display device including the display panel provided by the embodiment of the present disclosure.

At least one embodiment of the present disclosure also provides a driving method of the display panel provided by the embodiment of the present disclosure, including: the multi-channel selection circuit outputting the control signals to control the plurality of the data lines and the data drive circuit to be turned on or off; and in a process of displaying the frame of image on the display panel, when the plurality of data lines and the data drive circuit are turned on, the data drive circuit outputting the pixel voltages to sub-pixel units in the plurality of pixel units, so that the polarities of the pixel voltages received by two sub-pixel units corresponding to the same color in the adjacent two pixel units in each row of pixel units are different.

At least one embodiment of the present disclosure also provides an array substrate, which comprises a plurality of pixel units arranged in an array, a plurality of data lines, a plurality of switch circuits and a plurality of control lines. Each pixel unit comprises at least four sub-pixel units corresponding to different colors, respectively; each column of sub-pixel units is connected with one of the plurality of data lines, and the plurality of data lines are divided into a plurality of first data line groups and a plurality of second data line groups; the plurality of the switch circuits are divided into a plurality of first switch circuit groups and a plurality of second switch circuit groups, each data line in the plurality of first data line groups is respectively connected with one switch circuit in the plurality of first switch circuit groups, and each data line in the plurality of second data line groups is respectively connected with one switch circuit in the plurality of second switch circuit groups; each of the plurality of control lines is connected to one switch circuit in the plurality of first switch circuit groups and to one switch circuit in the plurality of second switch circuit groups, and different switch circuits in each of the plurality of first switch circuit groups are respectively connected to different control lines, and different switch circuits in each of the plurality of second switch circuit groups are respectively connected to different control lines.

BRIEF DESCRIPTION OF THE DRAWINGS

In order to more clearly explain the technical scheme of the embodiments of the present disclosure, the drawings of the embodiments will be briefly described in the following; it is obvious that the described drawings are only related to some embodiments of the invention and thus are not limitative of the present disclosure.

DETAILED DESCRIPTION

In order to make objects, technical details and advantages of the embodiments of the present disclosure, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A liquid crystal display panel generally includes a plurality of pixel units arranged in an array, for example, each pixel unit includes a red (R) sub-pixel unit, a green (G) sub-pixel unit, and a blue (B) sub-pixel unit. The inventors of the present disclosure have discovered that poor display may occur if a plurality of sub-pixel units of the same polarity are arranged together, for example, problems such as display color shift may occur.

Figure 1A:
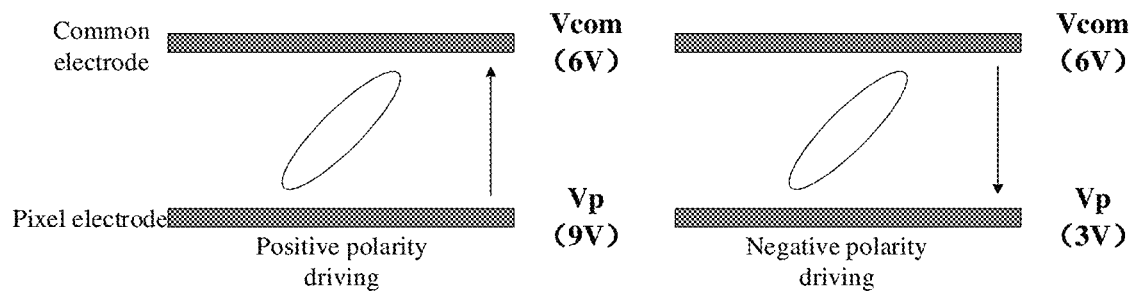
FIG. 1A is a schematic diagram showing positive polarity driving or negative polarity driving of a sub-pixel unit.

The liquid crystal molecules in each sub-pixel unit in the liquid crystal display panel are deflected under driving of a pixel electrode and a common electrode, thereby achieving display of different gray scales. For example, a plurality of different sub-pixel units may share a common electrode. It should be noted that in the embodiments of the present disclosure, a polarity of a sub-pixel unit indicates a polarity of a pixel voltage (or data signal) received by the sub-pixel unit. For example, as shown in FIG. 1A, when a common voltage Vcom (for example, 6V) is applied to the common electrode and a pixel voltage Vp (or data signal) is applied to the pixel electrode, the liquid crystal molecules are deflected under the driving of a voltage difference between the common electrode and the pixel electrode, and a line segment with an arrow in FIG. 1A indicates a direction of an electric field applied to the sub-pixel unit. For example, in the embodiment of the present disclosure, when the pixel voltage Vp (or data signal) is greater than the common voltage Vcom, it is called positive polarity driving, and at this time, the polarity of the sub-pixel unit is also referred to as a positive polarity. When the pixel voltage Vp (or data signal) is smaller than the common voltage Vcom, it is called negative polarity driving, and at this time, the polarity of the sub-pixel unit is also referred to as a negative polarity. The following embodiments are the same as those described herein and similar descriptions will not be described again.

In order to solve the above-mentioned problems of poor display such as color shift, in an array substrate, polarities of adjacent sub-pixel units in the same row can be reversed, that is, the polarities of adjacent two sub-pixel units in the same row are different, so as to change the directions of the electric fields applied to the adjacent two sub-pixel units. In the same row of pixel units, for example, sub-pixel units are repeatedly arranged in the order of an R sub-pixel unit, a G sub-pixel unit and a B sub-pixel unit (i.e., arranged according to the manner of an R sub-pixel unit, a G sub-pixel unit, a B sub-pixel unit, an R sub-pixel unit, a G sub-pixel unit and a B sub-pixel unit). The polarities of the sub-pixel units are designed in a manner of "+−+−+−" as shown in Table 1.

TABLE 1

| R sub-pixel unit | G sub-pixel unit | B sub-pixel unit | R sub-pixel unit | G sub-pixel unit | B sub-pixel unit |
| --- | --- | --- | --- | --- | --- |
| Positive polarity (+) | Negative polarity (−) | Positive polarity (+) | Negative polarity (−) | Positive polarity (+) | Negative polarity (−) |

The above arrangement manner of the polarities of the sub-pixel units (the arrangement manner as shown in Table 1) can ameliorate or avoid poor display problems such as color shift.

In order to further improve the resolution of the liquid crystal display panel, for example, a white (W) sub-pixel unit may be added into each pixel unit, that is, each pixel unit includes an R sub-pixel unit, a G sub-pixel unit, a B sub-pixel unit, and a W sub-pixel unit.

It should be noted that in the embodiment of the present disclosure, the R sub-pixel unit indicates that a light-emitting color corresponding to the R sub-pixel unit is red, for example, a light emitting side of the R sub-pixel unit is correspondingly provided with a color filter that transmits red light; similarly, the G sub-pixel unit indicates that a light-emitting color corresponding to the G sub-pixel unit is green, the B sub-pixel unit indicates that a light-emitting color corresponding to the B sub-pixel unit is blue, and the W sub-pixel unit indicates that a light-emitting color corresponding to the W sub-pixel unit is white. The following embodiments are the same as those described herein, and similar descriptions will not be described again.

For example, in the same row of pixel units, the sub-pixel units are sequentially and repeatedly arranged in the order of an R sub-pixel unit, a G sub-pixel unit, a B sub-pixel unit and a W sub-pixel unit in permutation with repetition (i.e., arranged according to the manner of an R sub-pixel unit, a G sub-pixel unit, a B sub-pixel unit, a W sub-pixel unit, an R sub-pixel unit, a G sub-pixel unit, a B sub-pixel unit and a W sub-pixel unit), and the polarities of the sub-pixel units are designed in a manner of "+−+−+−+−" as shown in Table 2.

TABLE 2

| R sub-pixel unit | G sub-pixel unit | B sub-pixel unit | W sub-pixel unit | R sub-pixel unit | G sub-pixel unit | B sub-pixel unit | W sub-pixel unit |
| --- | --- | --- | --- | --- | --- | --- | --- |
| Positive polarity(+) | Negative polarity (−) | Positive polarity(+) | Negative polarity (−) | Positive polarity(+) | Negative polarity (−) | Positive polarity(+) | Negative polarity(−) |

The inventors of the present disclosure have found that if the polarities of the sub-pixel units in the same row is still designed in a "+−+−+−+−" manner after the W sub-pixel units are added, color shift may occur when the liquid crystal display panel displays, thereby affecting the display effect.

Figure 1B:
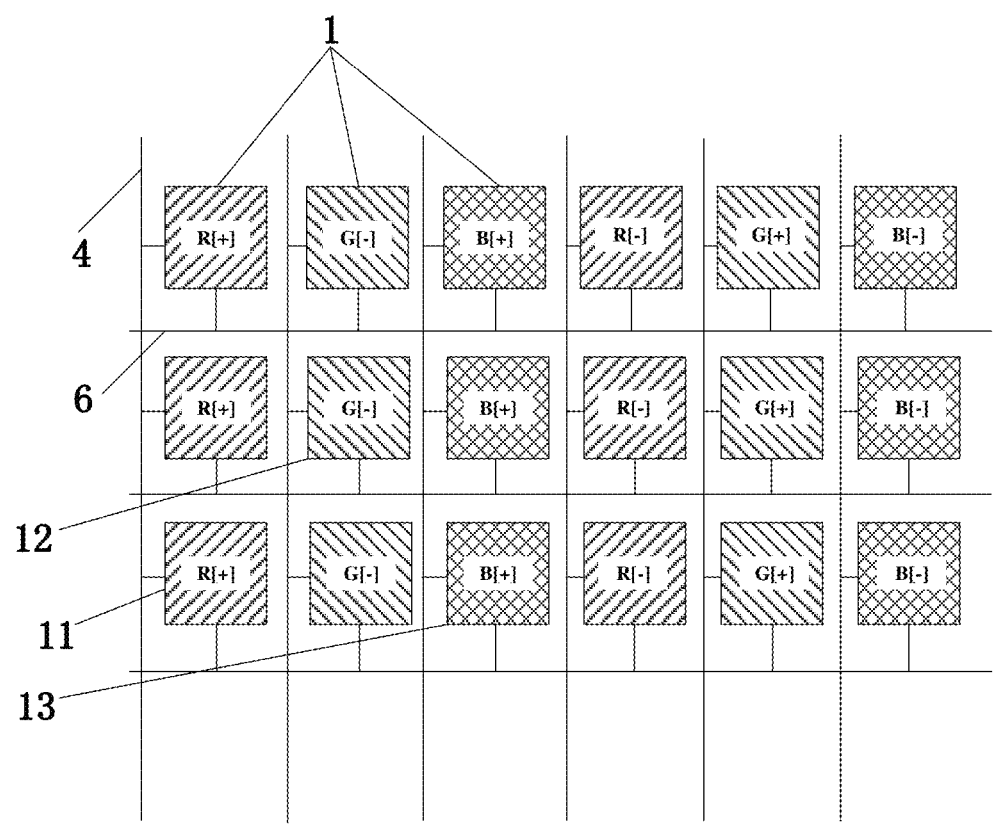
FIG. 1B is a schematic diagram of an array substrate.

FIG. 1B shows a schematic diagram of an array substrate, the array substrate includes a plurality of pixel units 1, a plurality of data lines 4, and a plurality of gate lines 6. Each pixel unit 1 is composed of a red (R) sub-pixel unit 11, a green (G) sub-pixel unit 12, and a blue (B) sub-pixel unit 13 which are sequentially arranged. Each of red sub-pixel units 11, green sub-pixel units 12, and blue sub-pixel units 13 is connected to the data line 4; red sub-pixel units 11, green sub-pixel units 12, and blue sub-pixel units 13 located in each row are connected to the same gate line 6. The polarities of sub-pixel units of each row are designed in a "+−+−+−" manner.

Figure 1C:
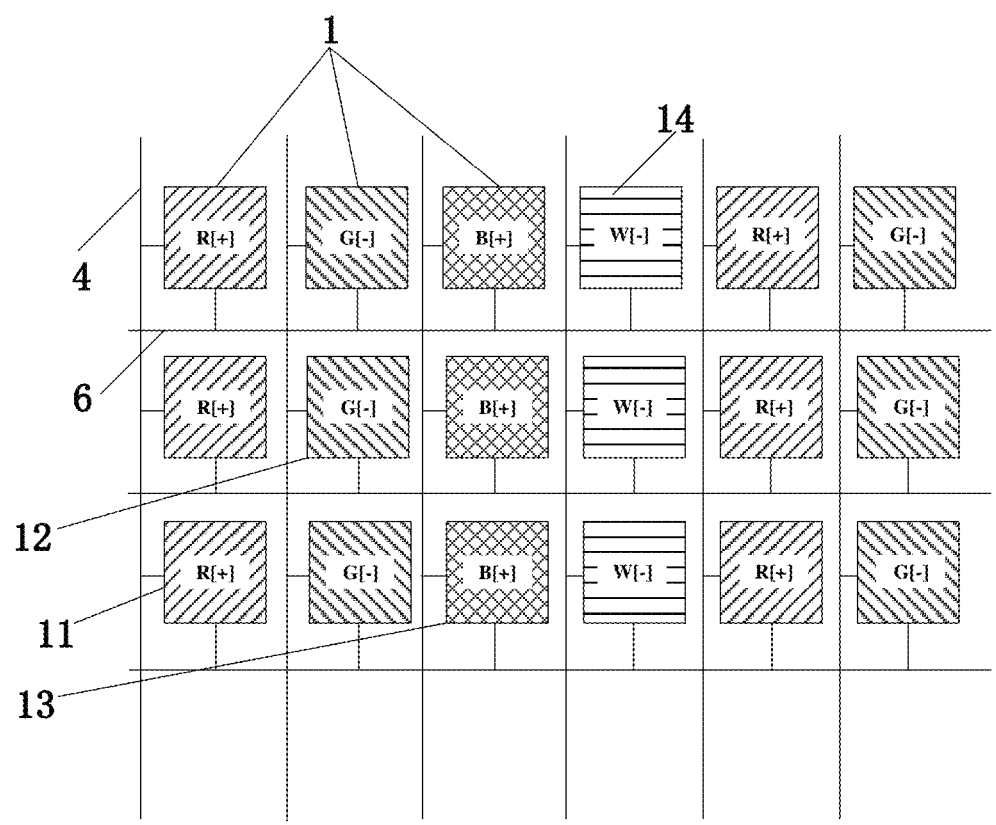
FIG. 1C is a schematic diagram of another array substrate.

In order to further improve the resolution of the liquid crystal display panel, for example, as shown in FIG. 1C, a white (W) sub-pixel unit may be added into each pixel unit. As shown in FIG. 1C, each pixel unit 1 is composed of a red (R) sub-pixel unit 11, a green (G) sub-pixel unit 12, a blue (B) sub-pixel unit 13, and a white (W) sub-pixel unit 14 which are sequentially arranged, and the polarities of sub-pixel units of each row are designed in a "+−+−+−" manner.

The inventors of the present application have found that if the polarities of the red sub-pixel unit 11, the green sub-pixel unit 12, the blue sub-pixel unit 13, and the white sub-pixel unit 14 as shown in FIG. 1C are set, the polarities of the sub-pixel units corresponding to the same color in adjacent two pixel units 1 are the same, for example, a polarity of a red sub-pixel unit 11 in a pixel unit 1 and a polarity of a red sub-pixel unit 11 in an adjacent other pixel unit 1 are both positive polarities. Because the polarities of the sub-pixel units corresponding to the same color in the adjacent two pixel units 1 are the same, poor display problems such as color shift may occur in the liquid crystal display panel when the liquid crystal display panel displays.

The array substrate provided by the embodiment of the present disclosure is intended to solve the above technical problems.

Embodiments of the present disclosure will be described in detail below with reference to the accompanying drawings.

Figure 2:
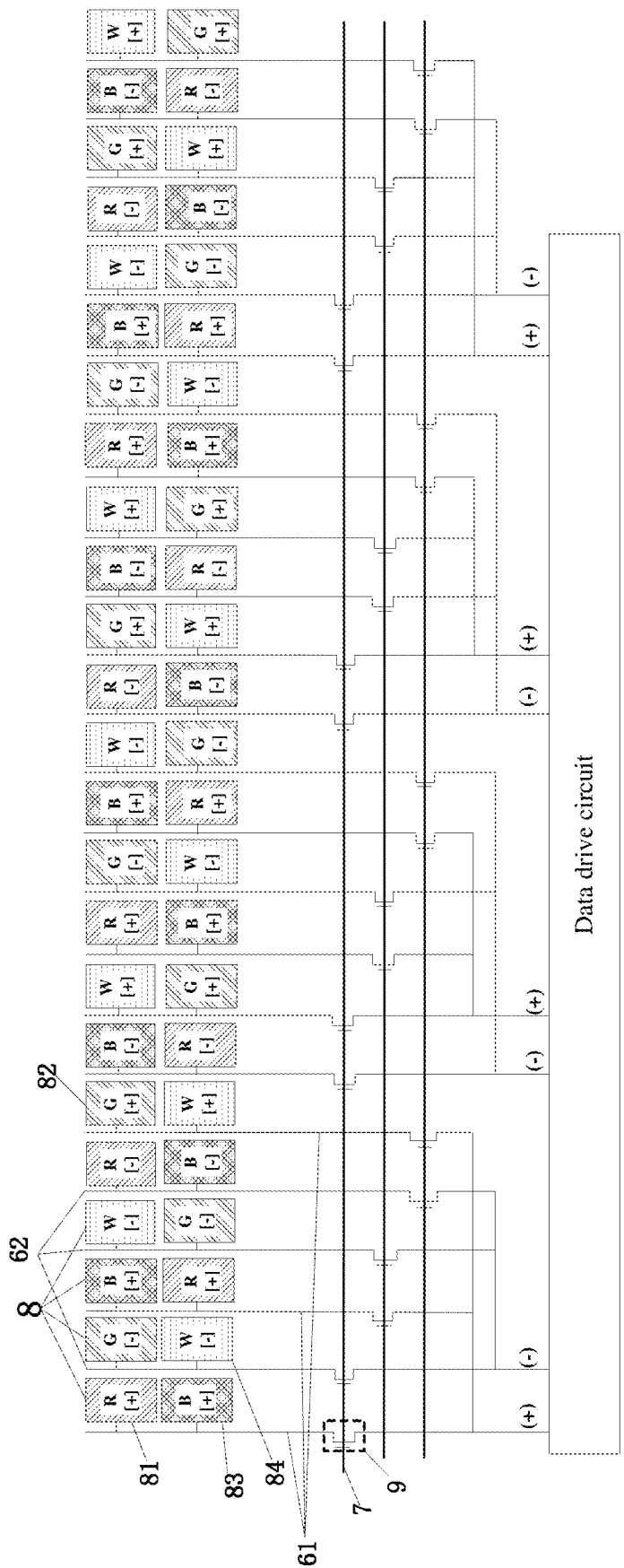
FIG. 2 is a schematic diagram of an array substrate according to at least one embodiment of the present disclosure.
Figure 3:
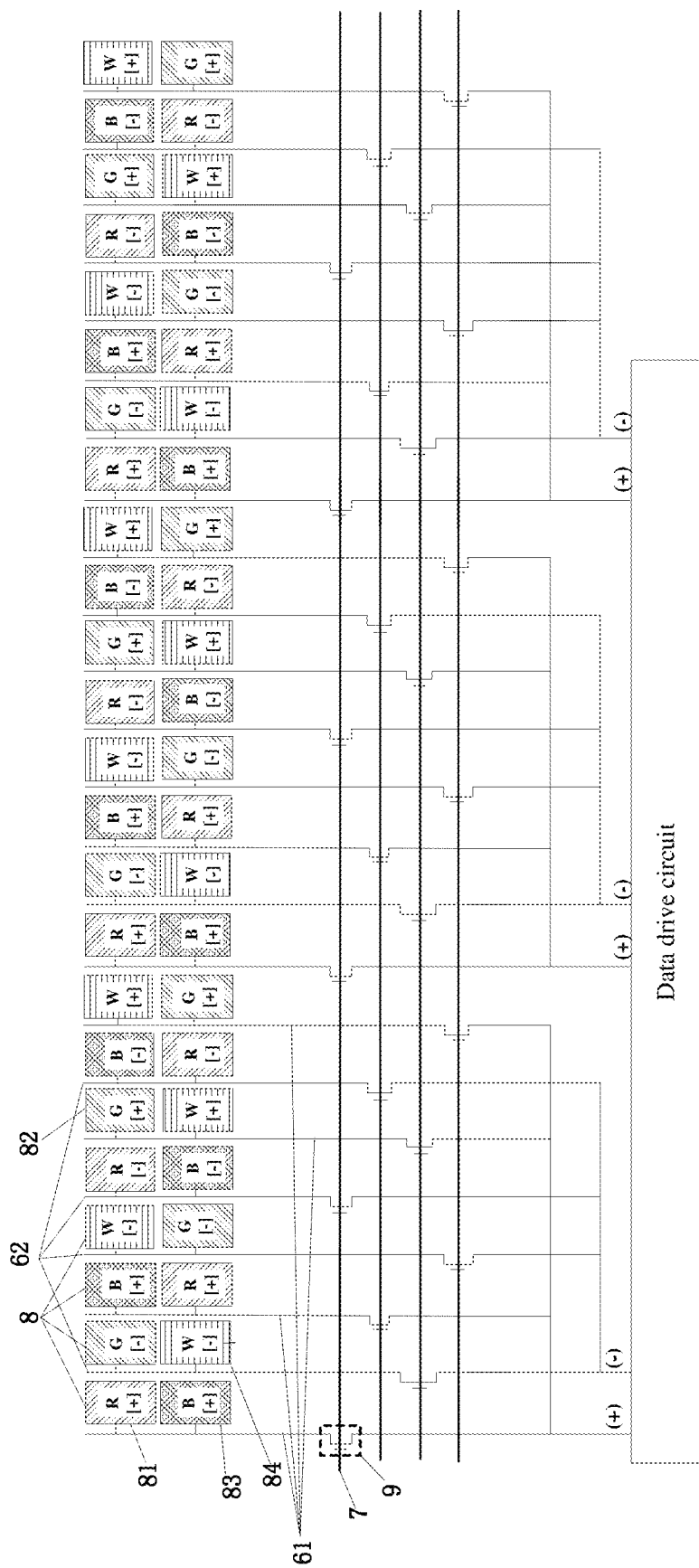
FIG. 3 is a schematic diagram of another array substrate according to at least one embodiment of the present disclosure.
Figure 4:
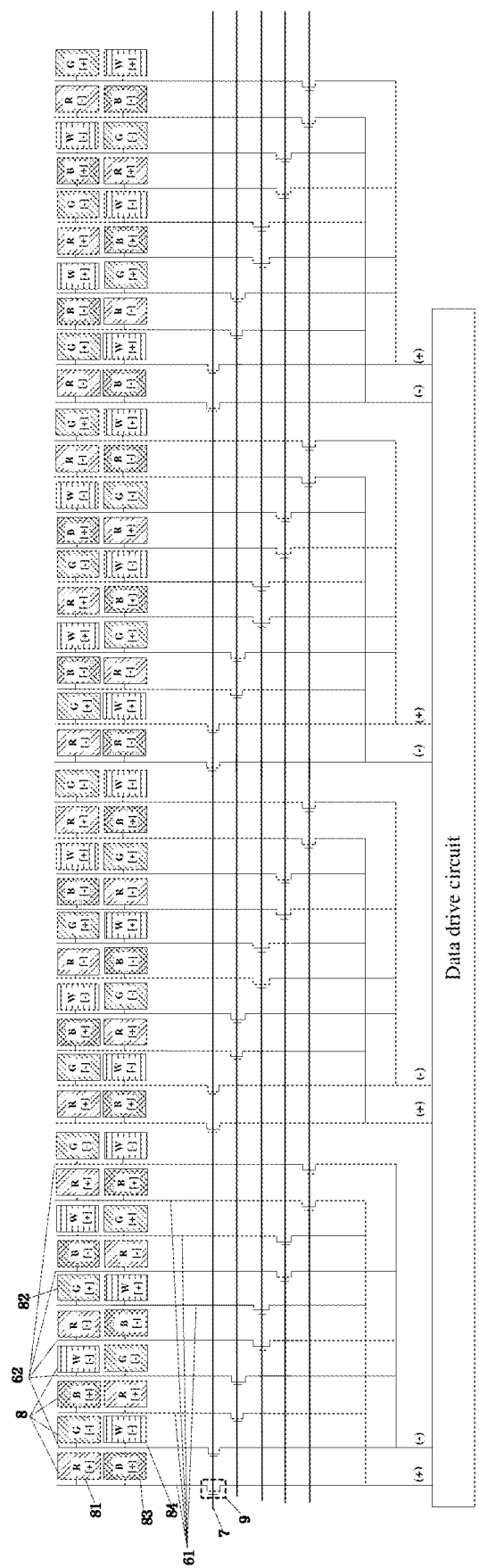
FIG. 4 is a schematic diagram of still another array substrate according to at least one embodiment of the present disclosure.
Figure 5:
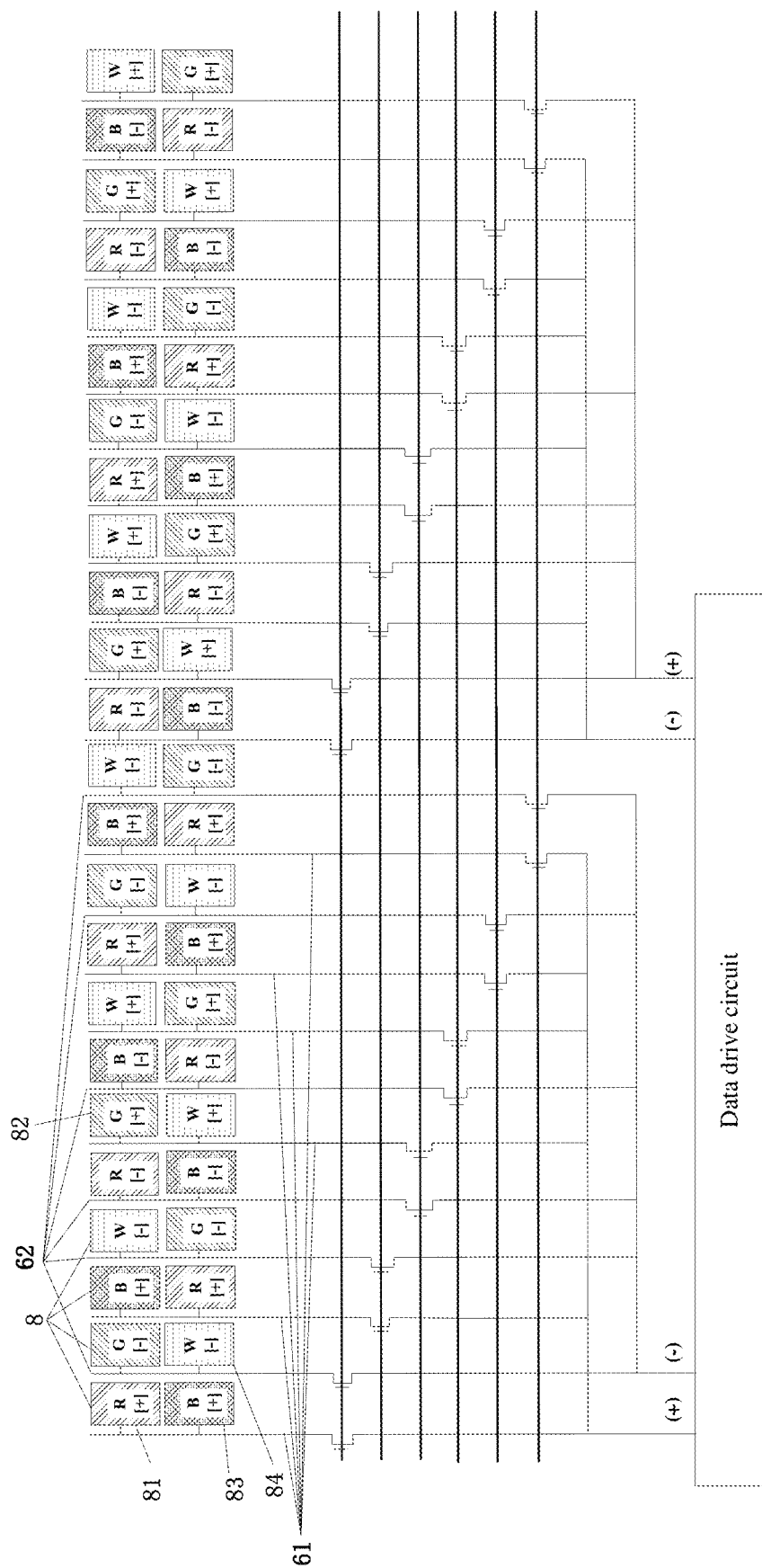
FIG. 5 is a schematic diagram of yet another array substrate according to at least one embodiment of the present disclosure.

At least one embodiment of the present disclosure provides an array substrate, as shown in FIG. 2, the array substrate includes a plurality of pixel units 8 arranged in an array, and each pixel unit 8 includes at least four sub-pixel units corresponding to different colors. For example, when the array substrate displays a frame of image, in each row of pixel units 8, polarities of pixel voltages received by two sub-pixel units corresponding to the same color in adjacent two pixel units 8 are different. A polarity of a pixel voltage is the magnitude of the pixel voltage relative to a common voltage. As described above, the common voltage is the voltage Vcom applied to the common electrode, and the pixel voltage is the voltage Vp applied to the pixel electrode.

For example, when a pixel voltage received by a sub-pixel unit is greater than the common voltage, a polarity of the pixel voltage is referred to as a positive polarity. When the pixel voltage received by a sub-pixel unit is less than the common voltage, the polarity of the pixel voltage is referred to as a negative polarity.

For example, the polarity of the pixel voltage transmitted to the sub-pixel unit is a positive polarity or a negative polarity. In each row of pixel units of the array substrate provided by the embodiment of the present disclosure, because the polarities of the pixel voltages received by the sub-pixel units corresponding to the same color in the adjacent two pixel units are different (for example, a polarity of a pixel voltage received by one sub-pixel unit is the positive polarity and a polarity of a pixel voltage received by the other sub-pixel unit is the negative polarity), thus the problem of poor display such as color shift caused by the reason that the polarities of the pixel voltages received by the two sub-pixel units corresponding to the same color in adjacent two pixel units are the same is avoided. Therefore, the display panel formed by using the array substrate provided by the embodiment of the present disclosure can ameliorate or avoid poor display problems such as color shift and the like when the display panel displays, thereby improving the display effect of the display panel and enhancing user experience.

For example, in some embodiments, each pixel unit 8 includes four sub-pixel units corresponding to different colors, as shown in FIG. 2, each pixel unit 8 may include a red sub-pixel unit 81 that displays red, a green sub-pixel unit 82 that displays green, a blue sub-pixel unit 83 that displays blue, and a white sub-pixel unit 84 that displays white. It should be noted that, in the embodiment of the present disclosure, the types of the four sub-pixel units included in the pixel unit 8 are not limited. For example, the white sub-pixel unit 84 may be replaced by a yellow sub-pixel unit that displays yellow or a sub-pixel unit that displays other colors.

For example, in some embodiments, sub-pixel units included in each pixel unit 8 are arranged in the order of a red sub-pixel unit 81, a green sub-pixel unit 82, a blue sub-pixel unit 83, and a white sub-pixel unit 84.

For example, in some embodiments, as shown in FIG. 2, adjacent two rows of pixel units are staggered by a distance of two sub-pixel units. For example, as shown in FIG. 2, relative to sub-pixel units in a first row, sub-pixel units in a second row are staggered by a distance of the two sub-pixel units, that is, in the sub-pixel units in the second row, the blue sub-pixel unit 83 and the white sub-pixel unit 84 are disposed before the red sub-pixel unit 81.

For example, as shown in FIG. 2, the array substrate provided by some embodiments of the present disclosure further includes a plurality of data lines, each column of sub-pixel units is connected to one data line, the plurality of data lines are divided into a plurality of first data line groups 61 and a plurality of second data line groups 62, and polarities of pixel voltages received by the data lines in the plurality of first data line groups 61 are different from polarities of pixel voltages received by the data lines in the plurality of second data line groups 62. It should be noted that in FIG. 2, (+) denotes a positive polarity and (−) denotes a negative polarity, the following examples are the same as those described herein and the similar description will not be described again. For example, as shown in FIG. 2, a data drive circuit may be used to provide pixel voltages required for sub-pixel units.

For example, in some embodiments, the polarities of the pixel voltages received by the data lines in the first data line group 61 are positive, that is, the pixel voltages received by the data lines in the first data line group 61 are larger than the common voltage, and the polarities of the pixel voltages received by the data lines in the second data line group 62 are negative, that is, the pixel voltages received by the data lines in the second data line group 62 are smaller than the common voltage.

For example, in some other embodiments, the polarities of the pixel voltages received by the data lines in the first data line group 61 are negative, that is, the pixel voltages received by the data lines in the first data line group 61 are smaller than the common voltage, and the polarities of the pixel voltages received by the data lines in the second data line group 62 are positive, that is, the pixel voltages received by the data lines in the second data line group 62 are larger than the common voltage.

It should be noted that, because the sub-pixel units in the pixel unit in the embodiment provided by the present disclosure can correspondingly display four different colors, therefore, a polarity inversion arrangement can be performed based on a multiple of 4 when designing the polarity inversion mode of the sub-pixel units, as long as the polarities of the sub-pixel units corresponding to the same color in adjacent pixel units are different. Table 3 shows several examples of polarity inversion.

TABLE 3

| Arrangement mode of sub-pixel units | Corresponding polarity inversion mode |
| --- | --- |
| RGBWRGBW | +−+−−+−+ |
| RGBWRGBW | ++−−−−++ |
| RGBWRGBW | +−−+−++− |
| RGBWRGBW | −+−++−+− |
| RGBWRGBW | −−++++−− |
| RGBWRGBW | −++−+−−+ |

For example, as shown in FIG. 2 to FIG. 5, the array substrate provided by some embodiments of the present disclosure further includes a plurality of switch circuits 9 and a plurality of control lines 7. The plurality of switch circuits 9 are divided into a plurality of first switch circuit groups and a plurality of second switch circuit groups, each data line in the plurality of first data line groups 61 is respectively connected with one switch circuit 9 in the plurality of first switch circuit groups, and each data line in the plurality of second data line groups 62 is respectively connected with one switch circuit 9 in the plurality of second switch circuit groups. In the embodiment of the present disclosure, the plurality of switch circuits 9 connected to the data lines in the first data line group 61 are referred to as the first switch circuit group, and the plurality of switch circuits 9 connected to the data lines in the second data line group 62 are referred to as the second switch circuit group.

For example, as shown in FIG. 2 to FIG. 5, each control line 7 is connected to one switch circuit 9 in the plurality of first switch circuit groups and to one switch circuit 9 in the plurality of second switch circuit groups, and different switch circuits 9 in each first switch circuit group are respectively connected to different control lines 7, and different switch circuits 9 in each second switch circuit group are respectively connected to different control lines 7.

For example, the number of control lines 7 may be set to one of 3, 4, 5, and 6, respectively. However, the embodiments of the present disclosure include but are not limited thereto. For those skilled in the art, those skilled in the art can set a greater number of control lines 7 according to actual needs.

FIG. 2 to FIG. 5 sequentially show the structural schematic diagrams of the array substrate provided by the embodiment of the present disclosure when the number of control lines 7 is 3, 4, 5 and 6. As can be seen from FIG. 2, FIG. 4 and FIG. 5, when the number of control lines 7 is one of 3, 5 and 6 respectively, one control line 7 controls the switch circuits 9 connected to the adjacent two data lines respectively. In this way, the circuit wiring of the array substrate can be simplified, the connection errors caused by workers due to the complicated circuit wiring can be greatly reduced, the manufacturing complexity can be reduced, and the manufacturing cost can be reduced.

For example, in some embodiments, each switch circuit 9 includes a transistor, a gate electrode of the transistor is connected to a corresponding control line 7 in the plurality of control lines 7, a first electrode of the transistor is connected to a corresponding data line in the plurality of data lines, and a second electrode of the transistor is configured to receive a pixel voltage. For example, the second electrode of the transistor may be connected to the data drive circuit.

Figure 6:
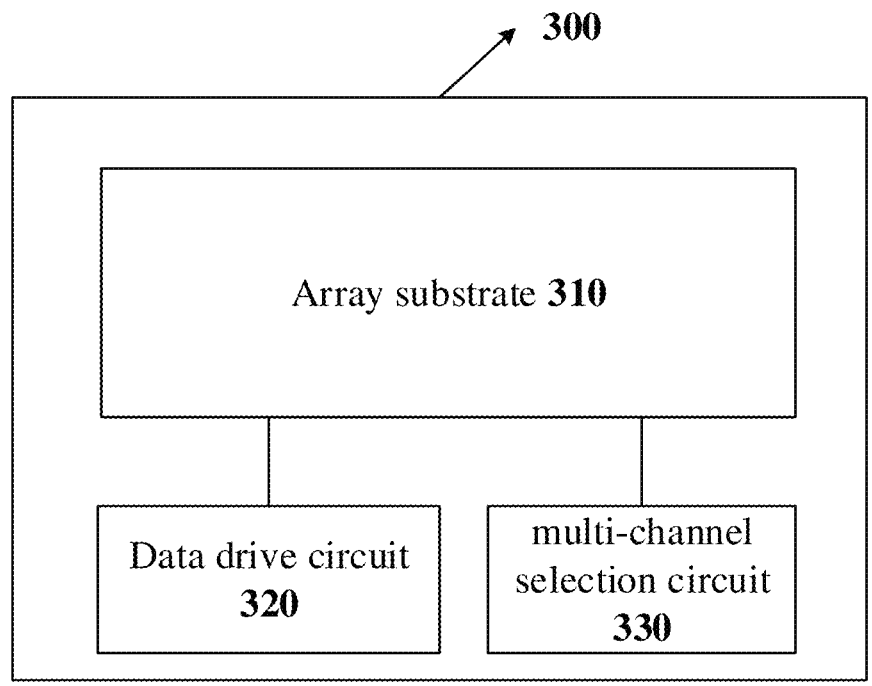
FIG. 6 is a schematic diagram of a display panel according to at least one embodiment of the present disclosure.

At least one embodiment of the present disclosure further provides a display panel, as shown in FIG. 6, the display panel 300 includes an array substrate 310, a data drive circuit 320, and a multi-channel selection circuit 330. For example, the array substrate 310 may be any one of array substrates as shown in FIG. 2 to FIG. 5.

For example, the data drive circuit 320 is connected with a plurality of data lines in the array substrate 310 to provide pixel voltages. For example, the data drive circuit 320 may include a data driving chip.

For example, the multi-channel selection circuit 330 is connected with a plurality of control lines 7 in the array substrate 310 to provide control signals, so as to control the plurality of data lines and the data drive circuit 320 to be turned on or off. For example, the multi-channel selection circuit 330 may include a multiplexer.

Because the multi-channel selection circuit 330 in the display panel 300 can output a control signal that controls the data line and the data drive circuit 320 to be turned on or off, and the display panel 300 can use one multi-channel selection circuit 330 to control the data lines used for transmitting pixel voltages of different polarities, thereby simplifying the circuit design of the display panel 300, and reducing the manufacturing cost. In addition, because the setting of the switch circuits 9 in the embodiment of the present disclosure adopts a regularized cycle design, and the multi-channel selection circuit 330 is provided, the output power of the data drive circuit 320 can be further reduced, thereby reducing the production cost.

Figure 7:
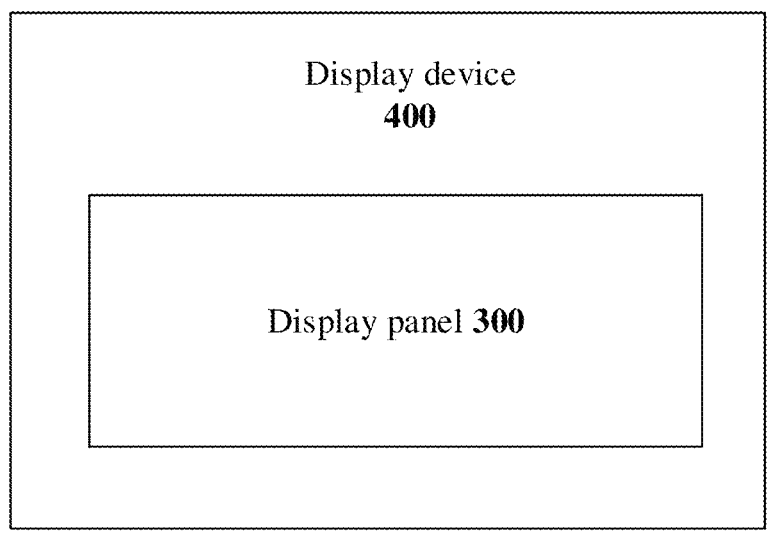
FIG. 7 is a schematic diagram of a display device according to at least one embodiment of the present disclosure.

At least one embodiment of the present disclosure further provides a display device, as shown in FIG. 7, the display device 400 includes a display panel 300, and for example, the display panel 300 may adopt the display panel 300 shown in FIG. 6.

It should be noted that the display device 400 can be any product or component with a display function such as a liquid crystal panel, a liquid crystal television, a display, an OLED panel, a OLED TV, an electronic paper display device, a mobile phone, a tablet computer, a notebook computer, a digital photo frame, a navigator, etc. The technical effect of the display device 400 provided by the embodiment of the present disclosure may be referred to the corresponding description of the array substrate or the display panel in the above-mentioned embodiments, and details are not repeated herein.

At least one embodiment of the present disclosure also provides an array substrate, which comprises a plurality of pixel units arranged in an array, a plurality of data lines, a plurality of switch circuits and a plurality of control lines. Each pixel unit comprises at least four sub-pixel units corresponding to different colors; each column of sub-pixel units is connected with a data line, and the data lines are divided into a plurality of first data line groups and a plurality of second data line groups; the plurality of switch circuits are divided into a plurality of first switch circuit groups and a plurality of second switch circuit groups, each data line in the first data line groups is respectively connected with one switch circuit in the first switch circuit groups, and each data line in the second data line groups is respectively connected with one switch circuit in the second switch circuit groups; each control line is connected to one switch circuit in the first switch circuit groups and to one switch circuit in the second switch circuit groups, and different switch circuits in each first switch circuit group are respectively connected to different control lines, and different switch circuits in each second switch circuit group are respectively connected to different control lines.

Figure 8:
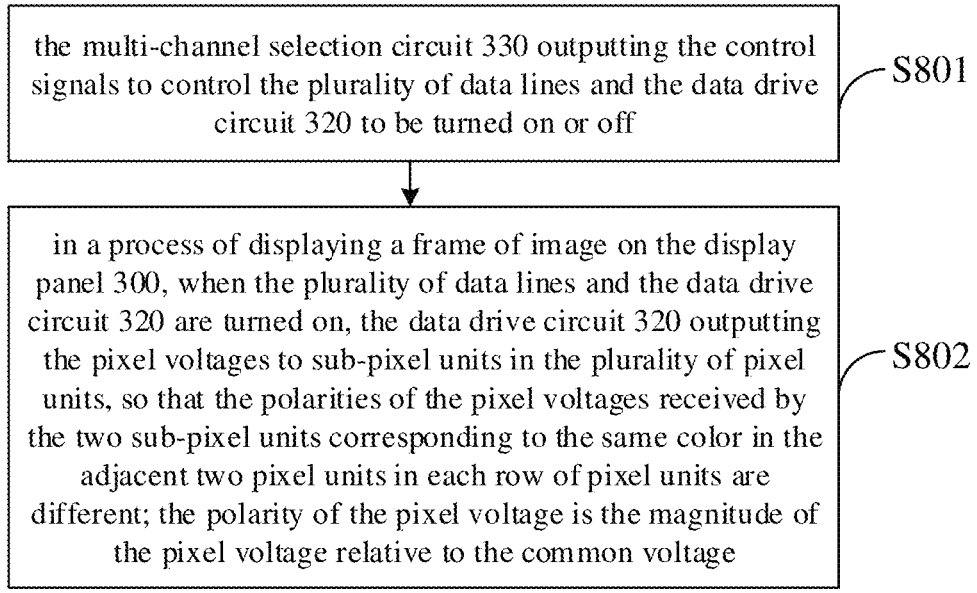
FIG. 8 is a schematic flowchart of a driving method of a display panel according to at least one embodiment of the present disclosure.

At least one embodiment of the present disclosure also provides a driving method, for example, the driving method can drive the display panel 300 provided in the above embodiment, as shown in FIG. 8, the driving method includes the following operation steps.

Step S801: the multi-channel selection circuit 330 outputting the control signals to control the plurality of data lines and the data drive circuit 320 to be turned on or off.

Step S802: in a process of displaying a frame of image on the display panel 300, when the plurality of data lines and the data drive circuit 320 are turned on, the data drive circuit 320 outputting the pixel voltages to sub-pixel units in the plurality of pixel units, so that the polarities of the pixel voltages received by the two sub-pixel units corresponding to the same color in the adjacent two pixel units in each row of pixel units are different; the polarity of the pixel voltage is the magnitude of the pixel voltage relative to the common voltage.

The beneficial effects obtained by applying the embodiments of the present disclosure include:

1. Because in each row of pixel units of the array substrate provided by the embodiment of the present disclosure, the polarities of the sub-pixel units corresponding to the same color in the adjacent two pixel units are different, so that the problem of poor display such as color shift and the like caused by the reason that the polarities of the sub-pixel units corresponding to the same color in the adjacent two pixel units are the same can be avoided, thereby the display effect of the display device adopting the array substrate is improved, and the user experience is enhanced.

2. Because the multi-channel selection circuit in the display panel can output control signals used for controlling the data line and the data drive circuit to be turned on or off, and the display panel 300 can use a multi-channel control circuit to control the data lines used for transmitting data signals of different polarities, thus the circuit design of the display panel can be simplified and the manufacturing cost can be reduced. In addition, because the arrangement of the switch circuit (and the first data terminal and the second data terminal) in the embodiment of the present disclosure adopts a regularized cycle design, and a multi-channel selection circuit is provided, which can further reduce the output power of the data drive circuit and further reduce the production cost.

The above description is only specific embodiments of the present disclosure, but the protection scope of the present disclosure is not limited thereto, and the protection scope of the present disclosure shall be based on the protection scope of the claims.

What is claimed is:

1. An array substrate, comprising a plurality of pixel units arranged in an array, a plurality of data lines, a plurality of switch circuits, and a plurality of control lines, wherein each of the plurality of pixel units comprises at least four sub-pixel units corresponding to different colors, respectively, when the array substrate displays a frame of image, in each row of the pixel units, polarities of pixel voltages received by two sub-pixel units corresponding to a same color in adjacent two pixel units are different, and a polarity of each pixel voltage represents a magnitude of each pixel voltage relative to a common voltage;

the plurality of switch circuits is connected to the plurality of pixel units through the plurality of data lines;

the plurality of the switch circuits are divided into a plurality of first switch circuit groups and a plurality of second switch circuit groups, polarities of pixel voltages received by sub-pixel units connected to the plurality of first switch circuit groups are different from polarities of pixel voltages received by sub-pixel units connected to the plurality of second switch circuit groups; and in each row of the pixel units, at least a part of switch circuits connected to all sub-pixel units of a same color is directly connected to a same control line among the plurality of control lines, sub-pixel units connected to each of the plurality of switch circuits are located in a same column of sub-pixel units, and receive pixel voltages of a same polarity, and comprise sub-pixel units corresponding to two different colors.

2. The array substrate according to claim 1, wherein each of the plurality of pixel units comprises four sub-pixel units corresponding to different colors, respectively, and adjacent two rows of pixel units are staggered by a distance of two sub-pixel units.

3. The array substrate according to claim 2, wherein each column of sub-pixel units is connected to one of the plurality of data lines, the plurality of data lines are divided into a plurality of first data line groups and a plurality of second data line groups, and polarities of pixel voltages received by data lines in the plurality of first data line groups are different from polarities of pixel voltages received by data lines in the plurality of second data line groups.

4. The array substrate according to claim 3, wherein the pixel voltages received by the data lines in the plurality of first data line groups are larger than the common voltage, and the pixel voltages received by the data lines in the plurality of second data line groups are smaller than the common voltage; or the pixel voltages received by the data lines in the plurality of first data line groups are smaller than the common voltage, and the pixel voltages received by the data lines in the plurality of second data line groups are larger than the common voltage.

5. The array substrate according to claim 3, wherein each data line in the plurality of first data line groups is respectively connected with one switch circuit in the plurality of first switch circuit groups, and each data line in the plurality of second data line groups is respectively connected with one switch circuit in the plurality of second switch circuit groups;

each of the plurality of control lines is connected to one switch circuit in the plurality of first switch circuit groups and to one switch circuit in the plurality of second switch circuit groups, different switch circuits in each of the plurality of first switch circuit groups are respectively connected to different control lines, and different switch circuits in each of the plurality of second switch circuit groups are respectively connected to different control lines.

6. The array substrate according to claim 5, wherein a number of the plurality of control lines comprises 3, 4, 5 or 6.

7. The array substrate according to claim 5, wherein each of the plurality of switch circuits comprises a transistor, a gate electrode of the transistor is connected to a corresponding control line in the plurality of control lines, a first electrode of the transistor is connected to a corresponding data line in the plurality of data lines, and a second electrode of the transistor is configured to receive a pixel voltage.

8. A display panel, comprising the array substrate according to claim 5, a data drive circuit, and a multi-channel selection circuit, wherein the data drive circuit is connected with the plurality of data lines to provide pixel voltages;

the multi-channel selection circuit is connected with the plurality of control lines to provide control signals to control the plurality of data lines and the data drive circuit to be turned on or off.

9. A display device, comprising the display panel according to claim 8.

10. A driving method of the display panel according to claim 8, comprising:

the multi-channel selection circuit outputting the control signals to control the plurality of data lines and the data drive circuit to be turned on or off; and in a process of displaying the frame of image on the display panel, when the plurality of data lines and the data drive circuit are turned on, the data drive circuit outputting the pixel voltages to sub-pixel units in the plurality of pixel units, so that the polarities of the pixel voltages received by the two sub-pixel units corresponding to the same color in the adjacent two pixel units in each row of pixel units are different.

11. An array substrate, comprising a plurality of pixel units arranged in an array, a plurality of data lines, a plurality of switch circuits, and a plurality of control lines, wherein each of the plurality of pixel units comprises at least four sub-pixel units corresponding to different colors, respectively;

each column of sub-pixel units is connected with one of the plurality of data lines, and the plurality of data lines are divided into a plurality of first data line groups and a plurality of second data line groups;

the plurality of the switch circuits are divided into a plurality of first switch circuit groups and a plurality of second switch circuit groups, each data line in the plurality of first data line groups is respectively connected with one switch circuit in the plurality of first switch circuit groups, and each data line in the plurality of second data line groups is respectively connected with one switch circuit in the plurality of second switch circuit groups;

each of the plurality of control lines is connected to one switch circuit in the plurality of first switch circuit groups and to one switch circuit in the plurality of second switch circuit groups, and different switch circuits in each of the plurality of first switch circuit groups are respectively connected to different control lines, and different switch circuits in each of the plurality of second switch circuit groups are respectively connected to different control lines;

polarities of pixel voltages received by sub-pixel units connected to the plurality of first switch circuit groups are different from polarities of pixel voltages received by sub-pixel units connected to the plurality of second switch circuit groups; and in each row of the pixel units, at least a part of switch circuits connected to all sub-pixel units of a same color is directly connected to a same control line among the plurality of control lines, sub-pixel units connected to each of the plurality of switch circuits are located in a same column of sub-pixel units, and receive pixel voltages of a same polarity, and comprise sub-pixel units corresponding to two different colors.

12. The array substrate according to claim 11, wherein a number of the plurality of control lines comprises 3, 4, 5 or 6.

13. The array substrate according to claim 11, wherein each of the plurality of pixel units comprises four sub-pixel units corresponding to different colors, respectively, and adjacent two rows of pixel units are staggered by a distance of two sub-pixel units.

14. A display panel, comprising the array substrate according to claim 11, a data drive circuit, and a multi-channel selection circuit,
wherein the data drive circuit is connected with the plurality of the data lines to provide pixel voltages;
the multi-channel selection circuit is connected with the plurality of control lines to provide control signals to control the plurality of data lines and the data drive circuit to be turned on or off.

15. A driving method of the display panel according to claim 14, comprising:
the multi-channel selection circuit outputting control signals to control the plurality of data lines and the data drive circuit to be turned on or off; and
in a process of displaying a frame of image on the display panel, when the plurality of data lines and the data drive circuit are turned on, the data drive circuit outputting the pixel voltages to sub-pixel units in the plurality of pixel units, so that polarities of the pixel voltages received by two sub-pixel units corresponding to a same color in adjacent two pixel units in each row of pixel units are different.

16. The array substrate according to claim 1, wherein in each row of the pixel units, the switch circuits connected to the all sub-pixel units of a same color are directly connected to the same control line among the plurality of control lines.

17. The array substrate according to claim 11, wherein in each row of the pixel units, the switch circuits connected to the all sub-pixel units of a same color are directly connected to the same control line among the plurality of control lines.

18. A driving method for driving the array substrate according to claim 1, wherein each of the plurality of pixel units comprises four sub-pixel units corresponding to different colors, respectively, the four sub-pixel units corresponding to different colors comprise a red sub-pixel unit, a green sub-pixel unit, a blue sub-pixel unit, and a white sub-pixel unit,
four sub-pixel units corresponding to different colors in any one pixel unit located in an odd-numbered row of the array are arranged in an order of red sub-pixel unit, green sub-pixel unit, blue sub-pixel unit, and white sub-pixel unit,
four sub-pixel units corresponding to different colors in any one pixel unit in an even-numbered row of the array are arranged in an order of blue sub-pixel unit, white sub-pixel unit, red sub-pixel unit, and green sub-pixel unit,
the any one pixel unit in the odd-numbered row and the any one pixel unit in the even-numbered row are located in a same column of the pixel units,
pixel units in each row of the pixel units are divided into a plurality of pixel unit groups, and each pixel unit group of the plurality of pixel unit groups comprises two pixel units,
the driving method comprises:
applying pixel voltages with a preset polarity arrangement to respective sub-pixel units of the two pixel units in each pixel unit group,
wherein the polarity of each pixel voltage comprises a positive polarity or a negative polarity, and the preset polarity arrangement comprises any one selected from a group consisting of: positive polarity negative polarity positive polarity negative polarity negative polarity positive polarity negative polarity positive polarity, positive polarity positive polarity negative polarity negative polarity negative polarity negative polarity positive polarity positive polarity, positive polarity negative polarity negative polarity positive polarity negative polarity positive polarity positive polarity negative polarity, negative polarity positive polarity negative polarity positive polarity positive polarity negative polarity negative polarity positive polarity negative polarity, negative polarity negative polarity positive polarity positive polarity positive polarity positive polarity positive polarity negative polarity negative polarity, negative polarity positive polarity negative polarity positive polarity negative polarity negative polarity positive polarity.

19. An array substrate, comprising a plurality of pixel units arranged in an array, a plurality of data lines, a plurality of switch circuits, and a plurality of control lines,
wherein each of the plurality of pixel units comprises at least four sub-pixel units corresponding to different colors, respectively,
when the array substrate displays a frame of image, in each row of the pixel units, polarities of pixel voltages received by two sub-pixel units corresponding to a same color in adjacent two pixel units are different, and a polarity of each pixel voltage represents a magnitude of each pixel voltage relative to a common voltage;
the plurality of switch circuits are connected to the plurality of pixel units through the plurality of data lines;
the plurality of the switch circuits are divided into a plurality of first switch circuit groups and a plurality of second switch circuit groups, polarities of pixel voltages received by sub-pixel units connected to the plurality of first switch circuit groups are different from polarities of pixel voltages received by sub-pixel units connected to the plurality of second switch circuit groups; and
in each row of the pixel units, switch circuits connected to all sub-pixel units of a same color are directly connected to a same control line among the plurality of control lines,
each column of sub-pixel units is connected to one of the plurality of data lines, the plurality of data lines are divided into a plurality of first data line groups and a plurality of second data line groups, and polarities of pixel voltages received by data lines in the plurality of first data line groups are different from polarities of pixel voltages received by data lines in the plurality of second data line groups,
each data line in the plurality of first data line groups is respectively connected with one switch circuit in the plurality of first switch circuit groups, and each data line in the plurality of second data line groups is respectively connected with one switch circuit in the plurality of second switch circuit groups;
each of the plurality of control lines is connected to one switch circuit in the plurality of first switch circuit groups and to one switch circuit in the plurality of second switch circuit groups, different switch circuits in each of the plurality of first switch circuit groups are respectively connected to different control lines, and different switch circuits in each of the plurality of second switch circuit groups are respectively connected to different control lines, each of the plurality of switch circuits comprises a transistor, a gate electrode of the transistor is connected to a corresponding control line in the plurality of control lines, a first electrode of the transistor is connected to a corresponding data line in the plurality of data lines, and a second electrode of the transistor is configured to receive a pixel voltage, second electrodes of transistors of a plurality of switch circuits in each first switch circuit group of the plurality of first switch circuit groups are electrically connected to each other, and are connected to a data drive circuit through one signal line, and second electrodes of transistors of a plurality of switch circuits in each second switch circuit group of the plurality of second switch circuit groups are electrically connected to each other, and are connected to the data drive circuit through one signal line.

20. The array substrate according to claim 19, wherein a quantity of data lines in each first data line group is identical with a quantity of data lines in each second data line group, and is four.

* * * * *